(12) United States Patent
Surnilla et al.

(10) Patent No.: US 7,263,433 B2
(45) Date of Patent: Aug. 28, 2007

(54) COMPUTER DEVICE TO CALCULATE EMISSION CONTROL DEVICE FUNCTIONALITY

(75) Inventors: Gopichandra Surnilla, West Bloomfield, MI (US); Harendra S. Gandhi, West Bloomfield, MI (US); Christian T. Goralski, Jr., Ypsilanti, MI (US); Robert W. McCabe, Lathrup Village, MI (US); George Graham, Ann Arbor, MI (US); Hungwen Jen, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 269 days.

(21) Appl. No.: 10/726,799

(22) Filed: Dec. 2, 2003

(65) Prior Publication Data

US 2005/0119822 A1 Jun. 2, 2005

(51) Int. Cl.
*F01N 11/00* (2006.01)
*G06G 7/70* (2006.01)

(52) U.S. Cl. .................. 701/114; 60/276; 702/113
(58) Field of Classification Search .............. 701/102, 701/103, 114, 115; 60/274, 276, 277, 285, 60/286; 123/41.1, 41.12, 41.31; 702/113, 702/182, 183, 184
See application file for complete search history.

(56) References Cited

U.S. PATENT DOCUMENTS

| | | | |
|---|---|---|---|
| 4,165,610 A | 8/1979 | Iizuka et al. |
| 5,375,583 A | 12/1994 | Meyer et al. |
| 5,402,641 A | 4/1995 | Katoh et al. |
| 5,690,072 A | 11/1997 | Meyer et al. |
| 5,720,260 A | 2/1998 | Meyer et al. |
| 5,758,493 A | 6/1998 | Asik et al. |
| 5,915,359 A | 6/1999 | Meyer et al. |
| 5,970,707 A | 10/1999 | Sawada et al. |
| 5,974,788 A | 11/1999 | Hepburn et al. |
| 6,119,450 A | 9/2000 | Boegner et al. |
| 6,199,373 B1 | 3/2001 | Hepburn et al. |
| 6,237,330 B1 | 5/2001 | Takahashi et al. |
| 6,336,320 B1 | 1/2002 | Tanaka et al. |
| 6,405,527 B2 | 6/2002 | Suzuki et al. |
| 6,408,618 B2 | 6/2002 | Ide |
| 6,421,599 B1 * | 7/2002 | Lippa et al. ................ 701/102 |
| 6,440,378 B1 | 8/2002 | Hirata et al. |
| 6,463,733 B1 | 10/2002 | Asik et al. |
| 6,477,832 B1 * | 11/2002 | Surnilla et al. ............... 60/285 |
| 6,502,387 B1 | 1/2003 | Asik et al. |
| 6,510,685 B2 | 1/2003 | Bolz et al. |
| 6,553,754 B2 | 4/2003 | Meyer et al. |
| 6,615,577 B2 | 9/2003 | Meyer et al. |
| 6,637,189 B1 | 10/2003 | Boegner et al. |
| 6,729,120 B2 | 5/2004 | Freisinger et al. |
| 6,792,750 B2 | 9/2004 | Nagai et al. |

(Continued)

*Primary Examiner*—Stephen K. Cronin
*Assistant Examiner*—Johnny H. Hoang
(74) *Attorney, Agent, or Firm*—Allan J. Lippa; Alleman Hall McCoy Russell & Tuttle, LLP

(57) ABSTRACT

A system is described for improving engine and vehicle performance by considering the effects of exhaust conditions on catalyst particle growth. Specifically, engine operation is adjusted to reduce operating in such conditions, and a diagnostic routine is described for determining the effects of any operation that can cause such particle growth. Further, routines are described for controlling various vehicle conditions, such as deceleration fuel shut-off, to reduce effects of the particle growth on emission performance.

25 Claims, 13 Drawing Sheets

U.S. PATENT DOCUMENTS

| | | |
|---|---|---|
| 6,843,052 B2 | 1/2005 | Hertzberg et al. |
| 6,857,264 B2 | 2/2005 | Ament |
| 6,892,527 B2 | 5/2005 | Ueda et al. |
| 6,922,986 B2 | 8/2005 | Rozario |
| 6,941,748 B2 | 9/2005 | Pott et al. |
| 7,051,516 B2 | 5/2006 | Pott et al. |
| 7,104,047 B2 | 9/2006 | Takubo |

\* cited by examiner

AIR/FUEL RATIO MODULATION STRATEGY TO HEAT DEVICE OR TO REDUCE SULFUR

AIR/FUEL AND TEMPERATURE PROFILE WITH DeSOx LEAN DEVICE TEMPERATURE PROTECTION ENABLED

COMPUTER DEVICE TO CALCULATE EMISSION CONTROL DEVICE FUNCTIONALITY

FIELD OF THE INVENTION

The field of the present invention relates to controlling engine air-fuel ratio operating during high temperature lean operation to prevent growth of precious metal particle size in an emission control device.

BACKGROUND AND SUMMARY OF THE INVENTION

Lean-burn gasoline engines can be more efficient and thus use less fuel and produce less carbon dioxide than corresponding engines operating under stoichiometric conditions.

To approach to treat engine emissions is to catalytically convert NO to a solid, prototypically barium nitrate, and store it in an emission control device during lean operation. The device is regenerated periodically by briefly shifting engine operation to stoichiometric or rich conditions, under which the barium nitrate becomes released NO that is then reduced. The operating temperature range for the device can be determined by the activity of the catalyst used to form the solid nitrate (defining the lower limit) and the stability of the nitrate under lean conditions (defining the upper limit). A typical range is approximately 200 to 500° C.

Although the device works well initially, its performance typically degrades over time. One reason for this is a slow accumulation of sulfate, derived from the combustion of fuel sulfur, which effectively competes with the nitrate for storage space. The sulfate is more stable than the nitrate, but it can be removed by an occasional exposure to rich conditions at a somewhat higher temperature than that used for normal regeneration of the trap.

The inventors herein, however, have recognized another reason for the degradation in performance of the device. Specifically, there can be a loss in activity of the catalyst used to form the solid nitrate. For example, if the catalyst is platinum supported on a high-surface-area oxide, its loss in activity can result from loss of platinum surface area due to coarsening of the supported particles of platinum. The inventors herein have also recognized that when these different modes of degradation can affect device performance in different ways.

As such, the inventors herein have recognized a disadvantage with prior approaches that monitor degradation. Specifically, the determination of device performance that fails to consider both effects results in inaccurate readings, and thus degraded overall performance. As an example, if device performance is evaluated without considering the interrelationship between degradation due to sulfur, and degradation due to particle coarsening, erroneous determinations of oxygen storage ability, NOx storage ability, and/or conversion efficiency can result.

The above disadvantages with prior approaches are overcome by a method for evaluating performance of an emission control device coupled in an exhaust system of a vehicle driven on the road, the method comprising:

determining a first factor based on a duration during which the emission control device is exposed to a lean air-fuel ratio above a limit value, said limit value determined as a function of temperature in the exhaust system;

determining a second factor based on an amount of sulfur contamination of said emission control device; and determining a performance value for said emission control device based on said first and second factors.

By determining emission control device performance based both on effects of sulfur contamination, and conditions indicative of platinum particle growth, it is possible to obtain a more accurate estimate that can then be used to improve engine control.

Note that there are various different ways to determine a duration during which the emission control device is exposed to a lean air-fuel ratio above a limit value, with the limit value determined as a function of temperature. For example, the lean air-fuel ratio can be calculated in terms of oxygen partial pressure, and the limit value can also be in terms of oxygen partial pressure.

Note also that the temperature in the exhaust system can be indicative of many different temperature, such as temperature of the emission control device, temperature of exhaust gasses flowing into the emission control device, or a generalized exhaust temperature indicative temperature in the exhaust system.

BRIEF DESCRIPTION OF THE DRAWINGS

The advantages described herein will be more fully understood by reading examples of embodiments, with reference to the drawings, wherein.

DETAILED DESCRIPTION OF EMBODIMENTS

Figure 1A:
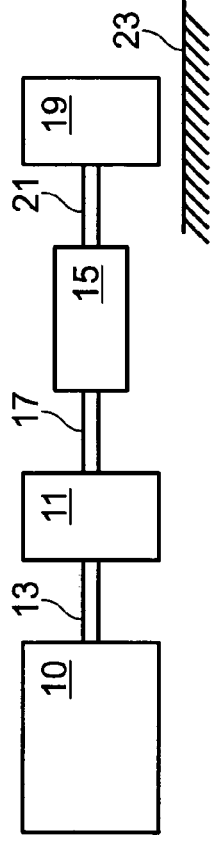
FIG. 1A is a block diagram of a vehicle powertrain illustrating various components related to the present invention.
Figure 1B:
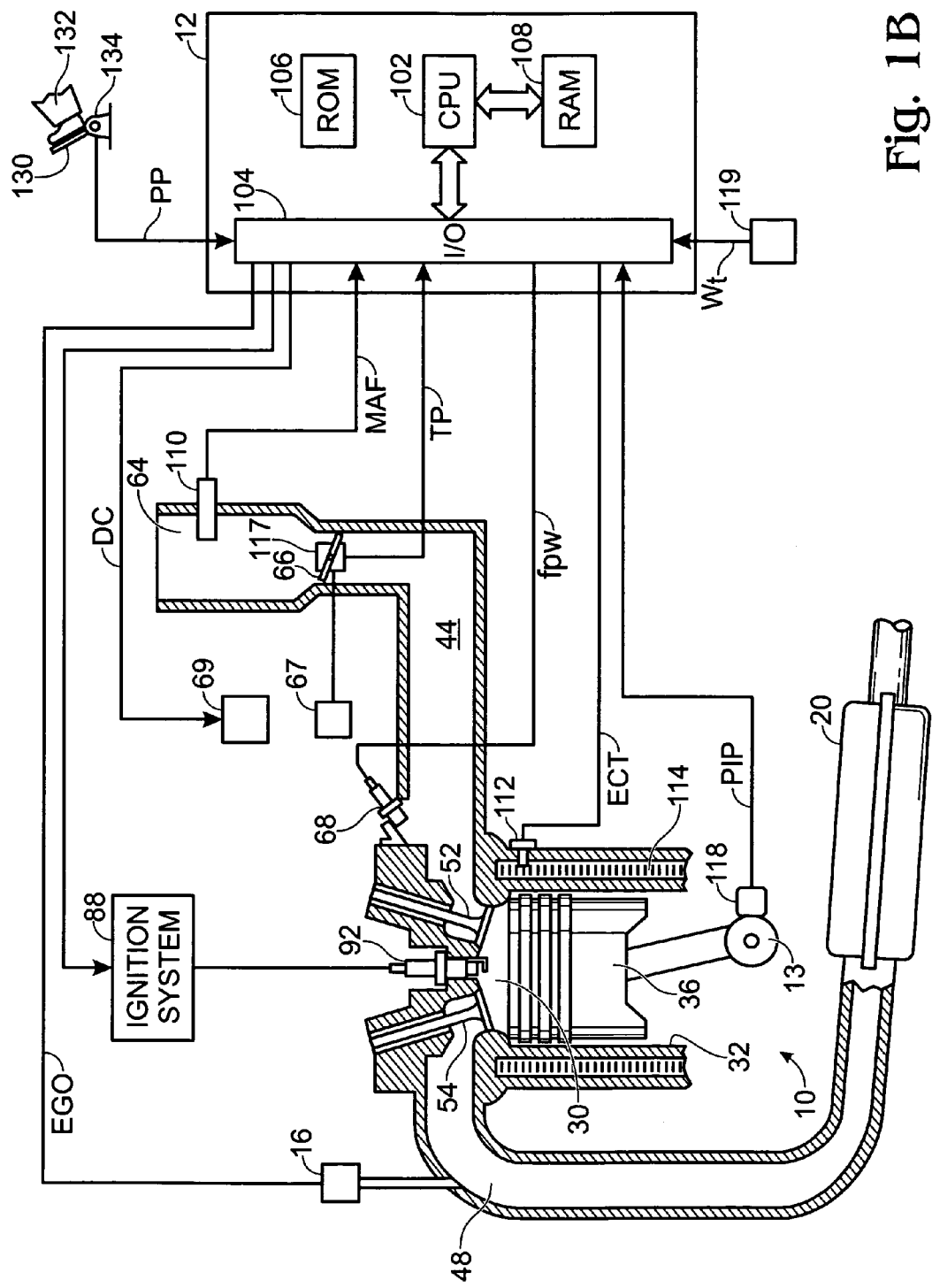
FIG. 1B is a block diagram of an example engine.

Referring to FIG. 1A, internal combustion engine 10, further described herein with particular reference to FIG. 1B, is shown coupled to torque converter 11 via crankshaft 13. Torque converter 11 is also coupled to transmission 15 via turbine shaft 17. Torque converter 11 has a bypass clutch (not shown) which can be engaged, disengaged, or partially engaged. When the clutch is either disengaged or partially engaged, the torque converter is said to be in an unlocked state. Turbine shaft 17 is also known as transmission input shaft. Transmission 15 comprises an electronically controlled transmission with a plurality of selectable discrete gear ratios. Transmission 15 also comprise various other gears, such as, for example, a final drive ratio (not shown). Transmission 15 is also coupled to tire 19 via axle 21. Tire 19 interfaces the vehicle (not shown) to the road 23.

Internal combustion engine 10 comprising a plurality of cylinders, one cylinder of which is shown in FIG. 1B, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of turbine speed (Wt) from turbine speed sensor 119, where turbine speed measures the speed of shaft 17, and a profile ignition pickup signal (PIP) from Hall effect sensor 118 coupled to crankshaft 13 indicating and engine speed (N).

Continuing with FIG. 1B, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the invention, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

The effect of various treatment conditions on platinum-particle size is illustrated below. The data is from testing of a sample emission control device (2 wt % Pt on high-surface-area BaO/Al2O3 with [BaO]:[Al2O3] of 1:6), subjected to various conditions. Then, the average platinum-particle size was measured by applying the Scherrer equation to the Pt(311) x-ray diffraction peak.

Figure 2:
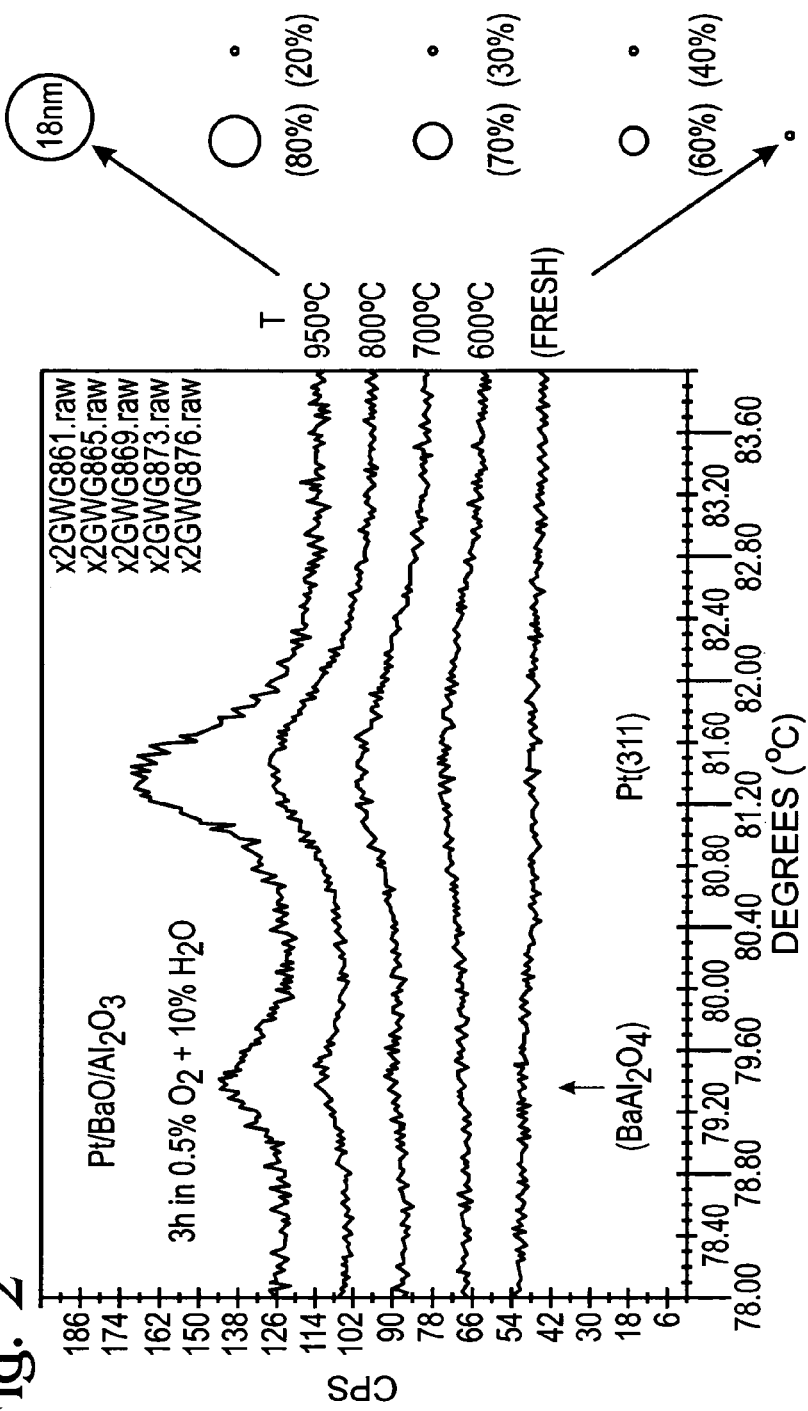
FIGS. 2–3 show experimental data indicating effects of exhaust conditions on particle growth.

As shown in FIG. 2, the platinum particles in a fresh device were undetectable by x-ray diffraction, implying that their average size was less than about 2 nm. A treatment of 3 h duration at 600° C. under 0.5% O2 with 10% H2O in N2 was sufficient to promote a noticeable degree of platinum-particle coarsening, though only about half of the platinum coarsened into detectable particles, with an average size of 5 nm. (The effect of increasing first the oxygen concentration to 13% and then, additionally, the time to 17 h at 600° C. was found to increase the average size of these particles to 9 nm and 12 nm, respectively.) The degree of coarsening increased rapidly with increasing temperature under 0.5% O2.

Figure 3:
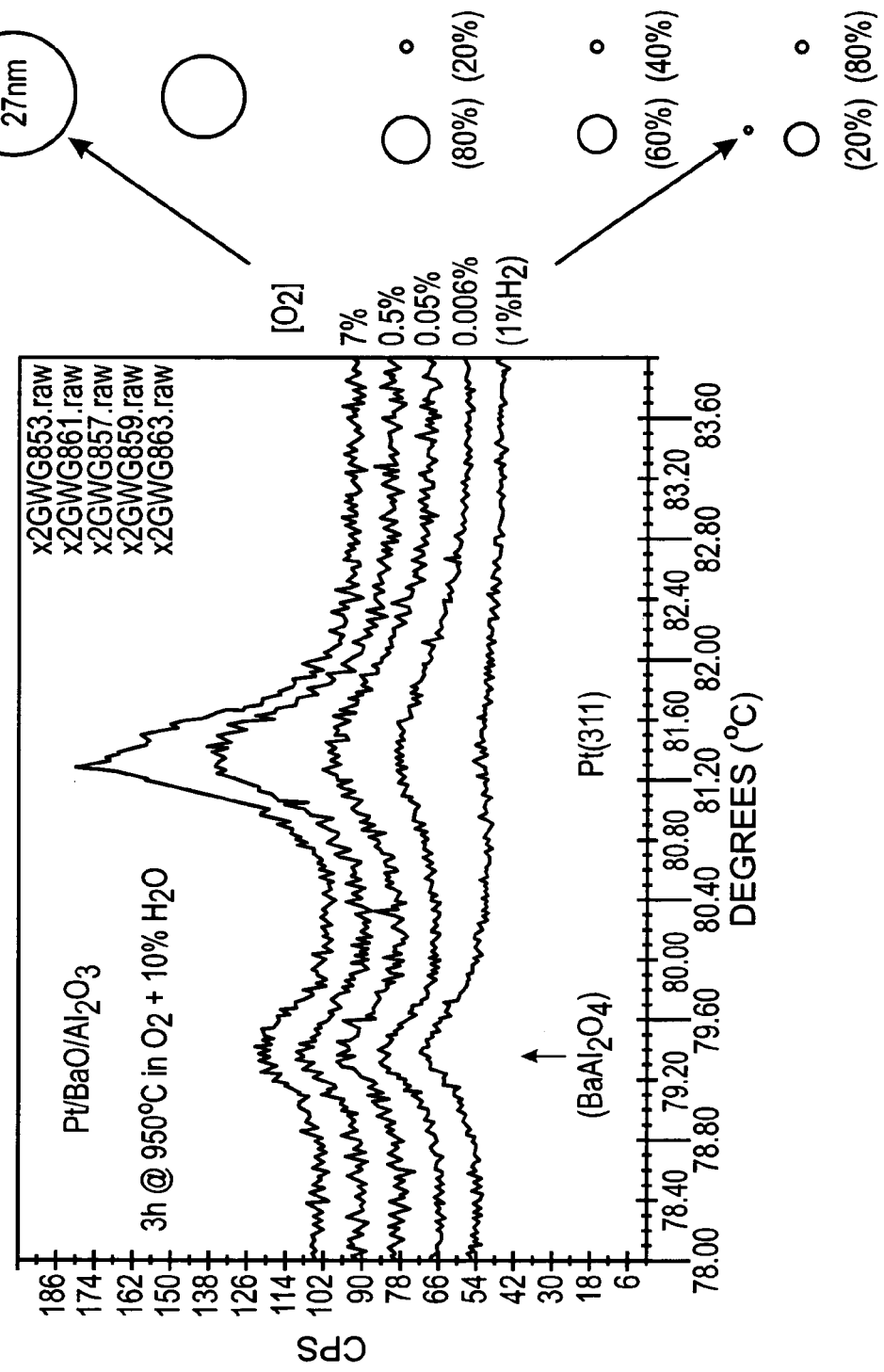

On the other hand, as shown in FIG. 3, the degree of coarsening diminished sharply with decreasing oxygen concentration, and relatively little coarsening occurred under 1% H2 even at the relatively high temperature of 950° C.

Figure 4A:
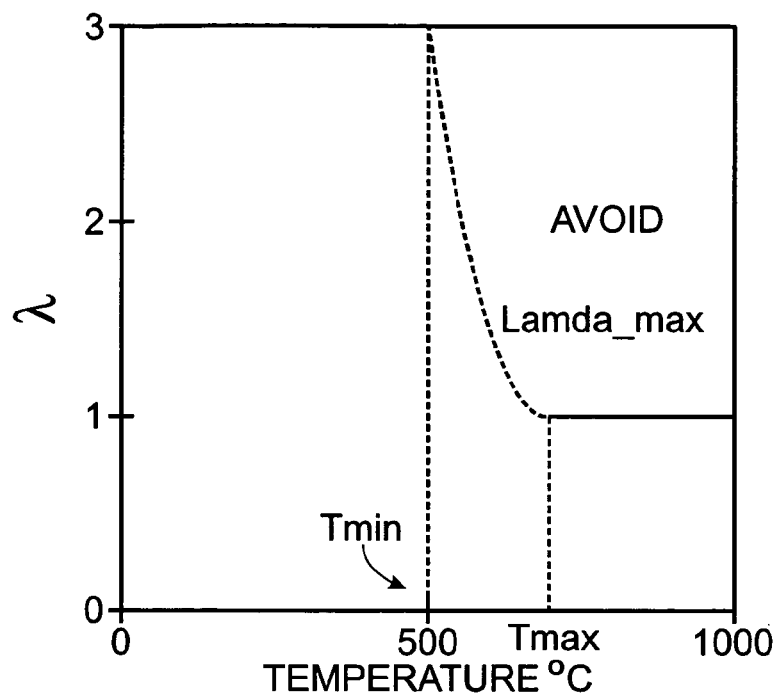
FIG. 4A is a graph illustrating regions of operation.

To reduce the coarsening of the platinum, one approach that can be used is to operate the system as illustrated graphically in FIG. 4A.

Specifically, as noted above, the functional parameter space for the device, in one example, extends from approximately 200 to 500° C. under lean conditions, with periodic brief excursions from lean to stoichiometric or rich conditions. As stated above, according to the present observations, relatively little platinum-particle coarsening takes place under such circumstances, so that little degradation of the NOx trap due to this mechanism should occur under normal operating conditions. Further, little additional platinum-particle coarsening takes place with extended time at much higher temperatures than the normal operating range, as long as the exhaust gas has been fully equilibrated and is stoichiometric or rich in composition.

However, one circumstance that can lead to significant coarsening of the platinum particles is a combination of relatively high temperature (i.e., above 500° C., for the particular device tested) and lean conditions. Therefore, an engine control strategy that avoids appreciable exposure of the device to such a circumstance is employed, reducing degradation of the device performance due to significant loss of platinum surface area. The present observations thus provide a map of temperature-lambda (T-$\lambda$) space for robust NOx trap operation as shown in FIG. 4A.

The solid line ($\lambda=1$, T>Tmax) is one boundary that preferably should not be crossed (going from $X \leq 1$ to $\lambda > 1$). Tmax represents the maximum temperature (shown to be approximately 700° C. for the particular device tested) whereby lean exposure of the NOx trap should be completely eliminated. Note however, that different temperature values, and air-fuel ratio values, can be determined for differing device configurations or compositions.

The curved dashed line represents another boundary that preferably should not be approached too closely (going up in temperature) for any appreciable time. The maximum lambda exposure under these conditions is defined as lambda_max. The temperature noted as Tmin is a temperature below which the trap can experience unlimited lean exposure. As shown, an example value for Tmin would be 500° C. Consequently, one embodiment uses a lean-burn engine temperature and lambda management strategy for vehicles equipped with such emission control devices that limits exposure of the trap to lean conditions at temperatures in the region labeled as AVOID.

Since engine operation on a vehicle can be broken down into different modes, such as, for example: idle, cruise, acceleration, and deceleration, the control logic can be enabled for specific modes that pose a higher risk of causing particle coarsening. From this standpoint, the highest risk modes to exceeding the lambda/temperature guidelines established to prevent Pt particle coarsening are cruise and deceleration. For the example device tested above, idle temperatures are expected to be well below T(min) and furthermore are typically entered from a deceleration condition. Acceleration is generally carried out at lambda less than or equal to 1, and hence, would not likely cause significant particle coarsening. However, depending on vehicle operating conditions and device characteristics, control adjustments as indicated in FIG. 4A may be necessary even in these modes.

Most cruise conditions involve part-throttle operation that can be expected to limit the trap temperature below T(min). However, in high-speed cruises, an enrichment scheme (to stoichiometric operation, or rich) can be employed to reduce surpassing the threshold: Lambda=1, T>T(min).

Regarding deceleration, lean-burn during this mode carries a significant risk of exceeding lambda/temperature limits that can cause particle grown degradation. Current deceleration strategies typically involve shutting off fuel to the engine during deceleration (DFSO) in order to conserve fuel and slow the vehicle. In light of the sensitivity of the device to high temperature, lean exposure as described above, DFSO can potentially cause significant deterioration of the device. To this end, various example embodiments are described below to reduce exposure beyond those described above to reduce deterioration, while still providing the fuel economy benefit of DFSO.

Figure 4B:
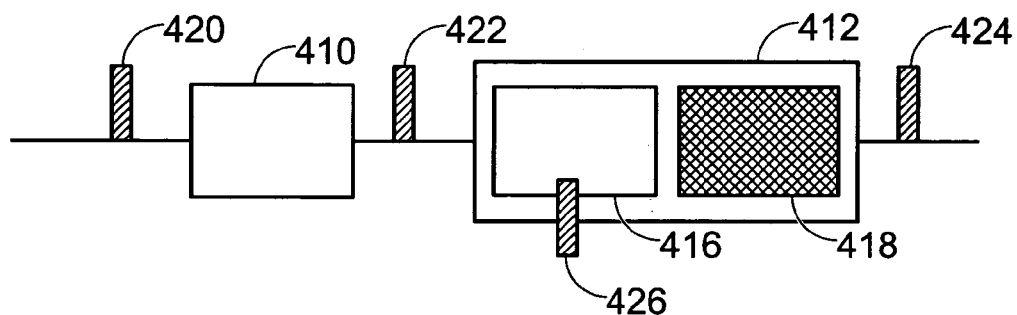
FIG. 4B is a block diagram of an example exhaust system.

An alternative illustration of a vehicle's exhaust system is shown in FIG. 4B. The system contains multiple emission control devices 410 and 412. In one example, the upstream device contains at least some oxygen storage capacity to provide good NOx conversion at engine operating conditions around stoichiometry. This oxygen storage capacity is a function of temperature. Oxygen sensors 420, 422, and 424 are also shown upstream and downstream of device 410 and 412. Further, device 412 is shown with two catalyst bricks, 416 and 418. Temperature sensor 426 is shown measuring temperature in device 412 at brick 416.

Device temperature information can come from a sensor, such as sensor 412, a model, or both.

The control strategies described below use a combination of the oxygen storage in the upstream device, as well as engine control under deceleration conditions to prevent exposure of the downstream device(s) to conditions of temperature and oxygen concentration where they could be degraded due to particle growth.

Figure 5:
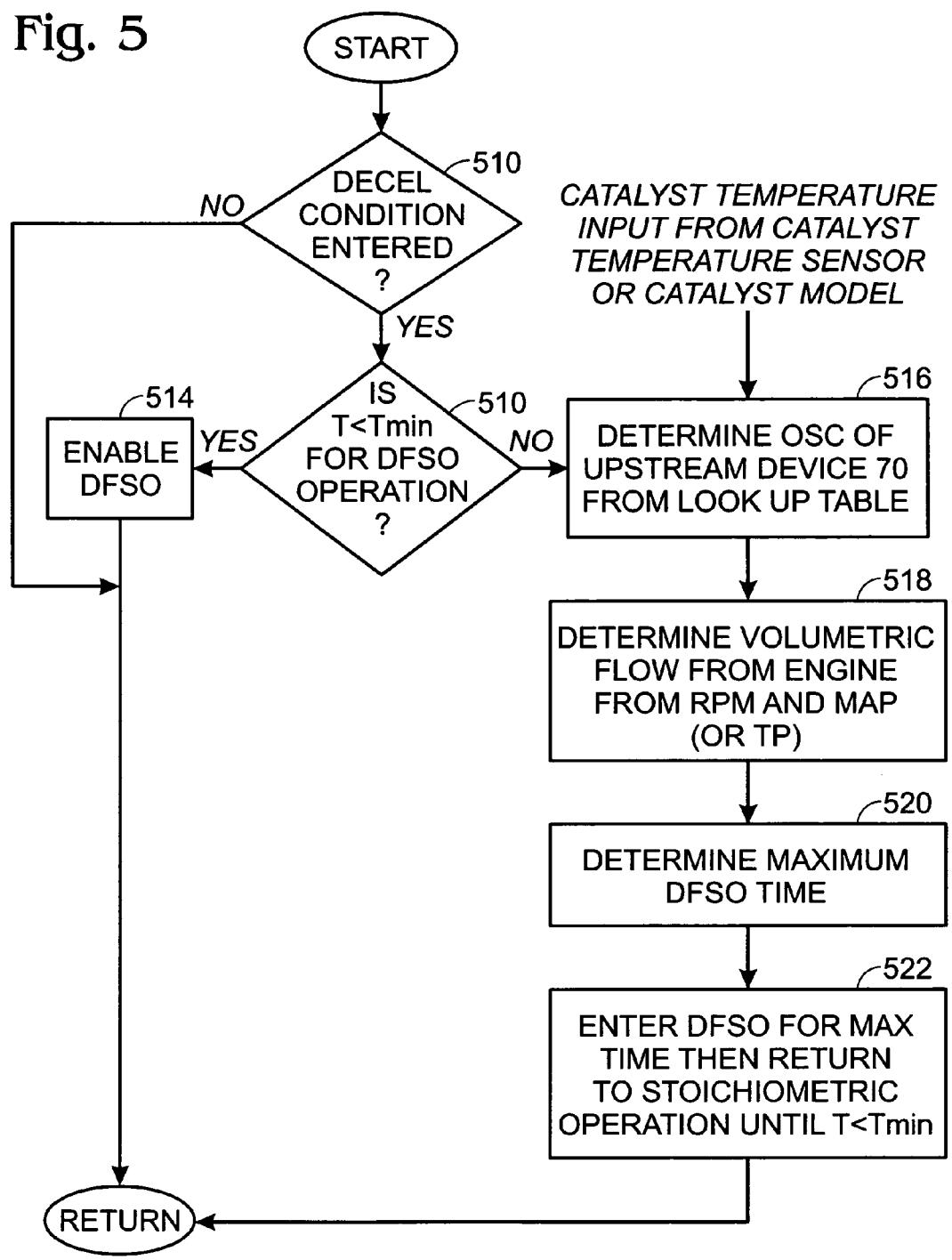
FIGS. 5–9, 11–13 and 15 are exemplary routines for controlling fuel cut out operation.

Referring now to FIG. 5, an exemplary routine is described for enabling deceleration fuel shut-off conditions of the vehicle. First, in step 510, the routine determines whether deceleration conditions have been entered by the vehicle. When the answer to step 510 is NO, the routine simply passes to the return block and repeats. Alternatively, when the answer to step 510 is YES, the routine continues to step 512. More specifically, the deceleration conditions are identified in step 510 based on various vehicle and engine operating conditions. In particular, the routine utilizes a measure of vehicle speed, vehicle deceleration, engine speed, engine load, throttle position, pedal position, transmission gear position, and various other parameters to determine whether the deceleration condition has been detected in step 510. As an example, the routine can check the following conditions: whether engine coolant temperature is greater than a threshold value; whether the throttle position is in a closed position; whether the transmission is in gear; whether the vehicle is accelerating; whether engine speed is greater than a threshold value; whether engine load is greater than a threshold value; and whether the ratio of vehicle speed over engine speed is greater than a threshold value.

Continuing with FIG. 5, in step 512 the routine determines whether a measured temperature of emission control device 72 (or an estimated temperature) is less than a minimum temperature (Tmin). In this particular example, the minimum temperature is set to be 500° C. However, various other temperature thresholds can be used depending on the catalyst formulation. When the answer to step 512 is YES, the routine continues to step 514 where deceleration fuel shut-off is enabled.

Alternatively, when the answer to step 512 is NO, the routine continues to step 516. In step 516, the routine calculates the oxygen storage capacity of the upstream catalyst based on a look up table. More specifically, the routine calculates the oxygen storage capacity of the emission control device 70 using a look up table as a function of catalyst temperature. This catalyst temperature can be either a measured catalyst temperature from temperature sensors, or estimated based on engine operating conditions such as engine speed and engine load. Furthermore, rather than utilizing oxygen storage capacity, the routine can utilize an estimate of an actual amount of oxygen stored in the emission control system (devices 70 and 72). This estimate can be formulated based on the history of engine operating conditions such as: engine air-fuel ratio, exhaust gas mass flow rate, and various other conditions. In this way, the routine can utilize an accurate estimate of the remaining amount of oxygen storage capacity (the difference between the maximum capacity and the current amount of oxygen stored) to determine how much lean (or fuel cut) operation can be allowed while still retaining catalyst conditions near the stoichiometric conditions.

Specifically, from step 516, the routine continues to step 518 to calculate the current volumetric (or mass) flow from engine conditions such as engine RPM and manifold pressure. However, other parameters can be used such as, for example: throttle position and engine speed, or a mass air flow sensor. From this, the routine continues to step 520 to calculate the length of time (or number of engine cycles) of fuel cutoff operation that can be tolerated before the oxygen stored in the emission control system reaches the oxygen storage capacity of the system. In other words, the routine estimates how much fuel cut (or lean) operation can be sustained in the emission control system in which the catalyst conditions will still be near the stoichiometric air-fuel ratio even though the engine is operating leaner than the stoichiometric air-fuel ratio.

As such, in step 522, the routine enables deceleration fuel shut-off operation for the calculated time of step 520 as long as the temperature remains above the minimum allowed temperature. If however, during this fuel cutoff operation allowed under step 522, the catalyst temperature falls below the minimum allowed temperature, then lean or fuel cut operation is allowed to continue even past the calculated time.

In this way, according to the operation of FIG. 5, it is possible to allow fuel cut operation even at high temperatures, while reducing any growth in a catalyst particle size in the emission control system. In other words, if emission control device temperatures are above the threshold that can degrade the catalyst particle size, then lean or fuel cut operation is enabled for the duration that corresponds to filling the oxygen storage capacity of the upstream and/or downstream emission control devices. After this point, the engine air-fuel ratio is returned to the stoichiometric or rich air-fuel ratio until the catalyst or emission control device temperatures are below the threshold value (Tmin) at which time further deceleration fuel shut off or lean operation can be enabled.

Figure 6:
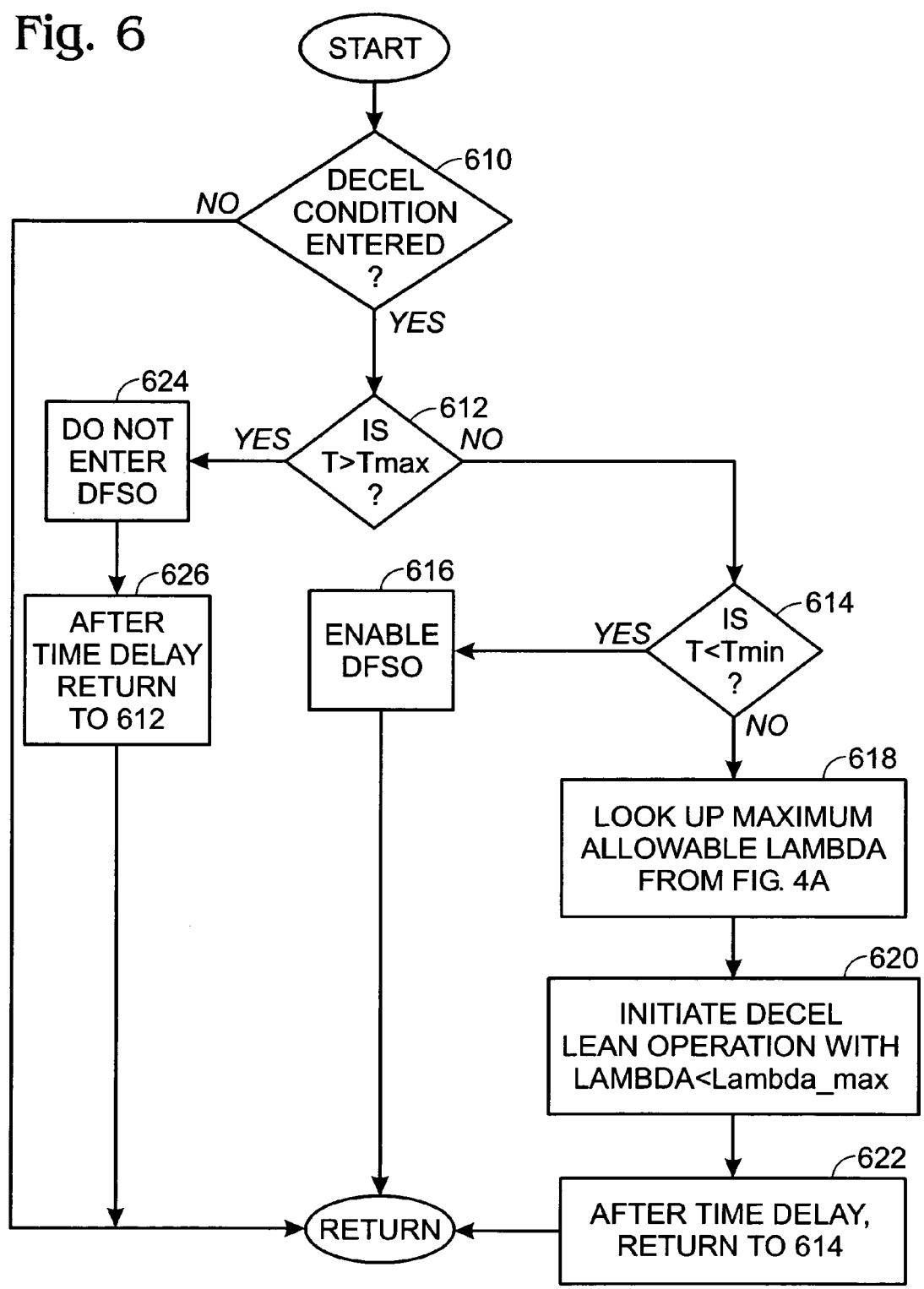

Referring now to FIG. 6, an alternate embodiment is described for enabling deceleration fuel shutoff. First, in step 610, the routine determines whether deceleration condition has been entered in a manner similar to that described above with regard step 510.

When the answer to 610 is NO, the routine continues to the return block. Alternatively, when the answer to step 610 is yes, the routine continues to step 612. In step 612, the routine determines whether the measured (or estimated) temperature of the downstream emission control device 72 is greater than the maximum allowed temperature (Tmax). When the answer to step 612 is NO, the routine continues to step 614. In step 614, the routine determines whether the measured or estimated temperature is less than the threshold (Tmin). When the answer to step 614 is YES, the routine continues to step 616 to enable deceleration fuel shutoff.

Alternatively, when the answer to step 614 is NO, the routine continues to step 618 to determine the maximum allowable air-fuel ratio from the look up table embodying the information in FIG. 4A. Next, the routine continues to step 620, where deceleration with lean engine operation where the engine air-fuel ratio is maintained less than the max allowable air-fuel ratio calculated in step 618. Then, in step 622, the routine calculates a time delay before returning to again check emission control device temperature in step 614. The time delay, or number of engine cycles delay, can be calculated based on various factors such as, for example: the maximum available oxygen storage capacity and the current amount of oxygen stored in the emission control system.

Note also that the maximum allowable air-fuel ratio determined in step 618 represents an average exhaust gas mixture air-fuel ratio value. As such, rather than operating all cylinders at a lean air-fuel ratio smaller than the maximum allowed air-fuel ratio in step 620, in an alternate embodiment, the engine can be operated with some cylinders in the cut operation and some cylinders operating at a lean or rich air-fuel ratio such that the exhaust gas mixture air-fuel ratio is within the allowable range.

Operation according to the routine in FIG. 6, it is both possible to enable lean deceleration conditions to thereby save fuel, while at the same time reducing any potential coarsening of the catalyst particle size in the emission control system.

Continuing with FIG. 6, when the answer to step 612 is YES, the routine continues to step 624 to disable deceleration fuel shutoff operation for a predetermined amount of time as calculated in step 626.

Figure 7:
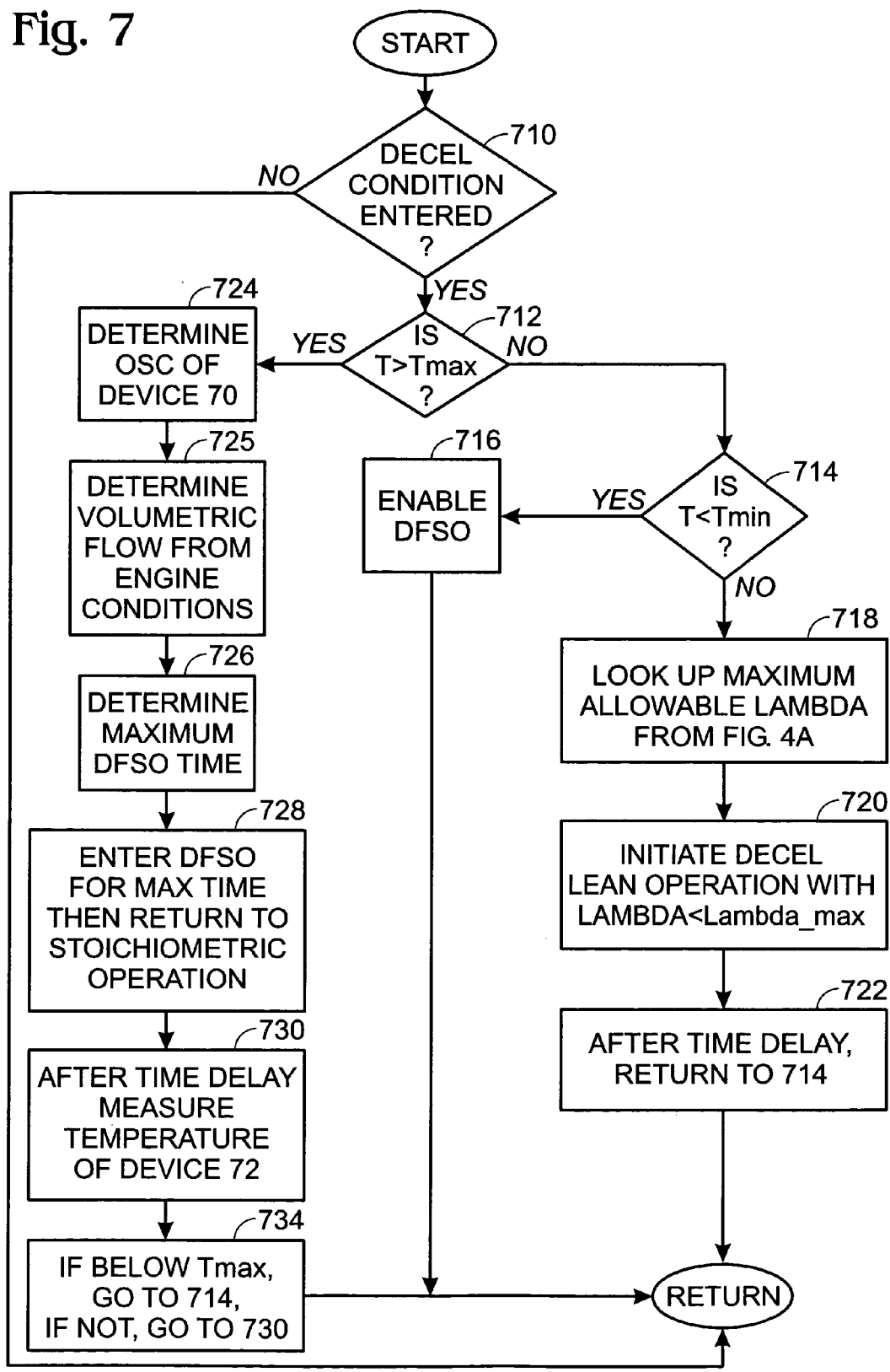

Referring now to FIG. 7, yet another alternate embodiment is described for enabling deceleration fuel shutoff. First, in step 710, the routine determines whether deceleration condition has been entered in a manner similar to that described above with regard step 510.

When the answer to step 710 is NO, the routine continues to the return block. Alternatively, when the answer to step 710 is YES, the routine continues to step 712. In step 712, the routine determines whether the measured (or estimated) temperature of the downstream emission control device 72 is greater than the maximum allowed temperature (Tmax). When the answer to step 712 is NO, the routine continues to step 714. In step 714, the routine determines whether the measured or estimated temperature is less than the threshold (Tmin). When the answer to step 714 is YES, the routine continues to step 716 to enable deceleration fuel shutoff.

Alternatively, when the answer to step 714 is NO, the routine continues to step 718 to determine the maximum allowable air-fuel ratio from the look up table embodying the information in FIG. 4A. Next, the routine continues to step 720, where deceleration with lean engine operation where the engine air-fuel ratio is maintained less than the max allowable air-fuel ratio calculated in step 718. Then, in step 722, the routine calculates a time delay before returning to again check emission control device temperature in step 614. The time delay, or number of engine cycles delay, can be calculated based on various factors such as, for example: the maximum available oxygen storage capacity and the current amount of oxygen stored in the emission control system.

Note also that he maximum allowable air-fuel ratio determined in step 718 can represent an average exhaust gas mixture air-fuel ratio value. As such, rather than operating all cylinders at a lean air-fuel ratio smaller than the maximum allowed air-fuel ratio in step 720, in an alternate embodiment, the engine can be operated with some cylinders in the cut operation and some cylinders operating at a lean or rich air-fuel ratio such that the exhaust gas mixture air-fuel ratio is within the allowable range.

According to operation as in FIG. 7, it is both possible to enable lean deceleration conditions to thereby save fuel, while at the same time reducing any potential coarsening of the catalyst particle size in the emission control system.

Continuing with FIG. 7, when the answer to step 712 is YES, the routine continues to step 724 to determine whether deceleration of fuel shutoff can be allowed taking advantage of oxygen storage of an upstream catalyst to prevent the downstream air-fuel ratio entering device 72 from becoming leaner than the allowed lean air-fuel limit. Specifically, in step 724, the routine determines the oxygen storage of device 70 based on operating conditions such as, for example: device temperature, engine speed, engine load, and various other parameters which can be optionally included. Next, in step 726, the routine determines a maximum allowable deceleration fuel shutoff time based upon the oxygen storage determined in step 724, and engine operating parameters determined in step 725. Specifically, in step 725, the routine utilizes information such as, for example: volumetric flow of the engine based on engine rpm and manifold pressure (or throttle position, or engine load). Specifically, in step 726, the routine determines a period of time in which the engine can continue deceleration fuel shutoff conditions without filling the upstream device 70 past its oxygen storage capacity. Note that instead of using a time period, various other periods such as, for example: a number of engine rotations, or a number of engine cycles. Next, in step 728, the routine enters deceleration engine fuel shutoff for the maximum time determined in step 726, and after this time, returns to stoichiometric operation.

Note that during this operation, in step 730 and 734, the routine continues to monitor the temperature of device 72. If the temperature of device 72 falls below the maximum allowable temperature, the routine transitions to step 714. If not, the routine returns to step 730.

Figure 8:
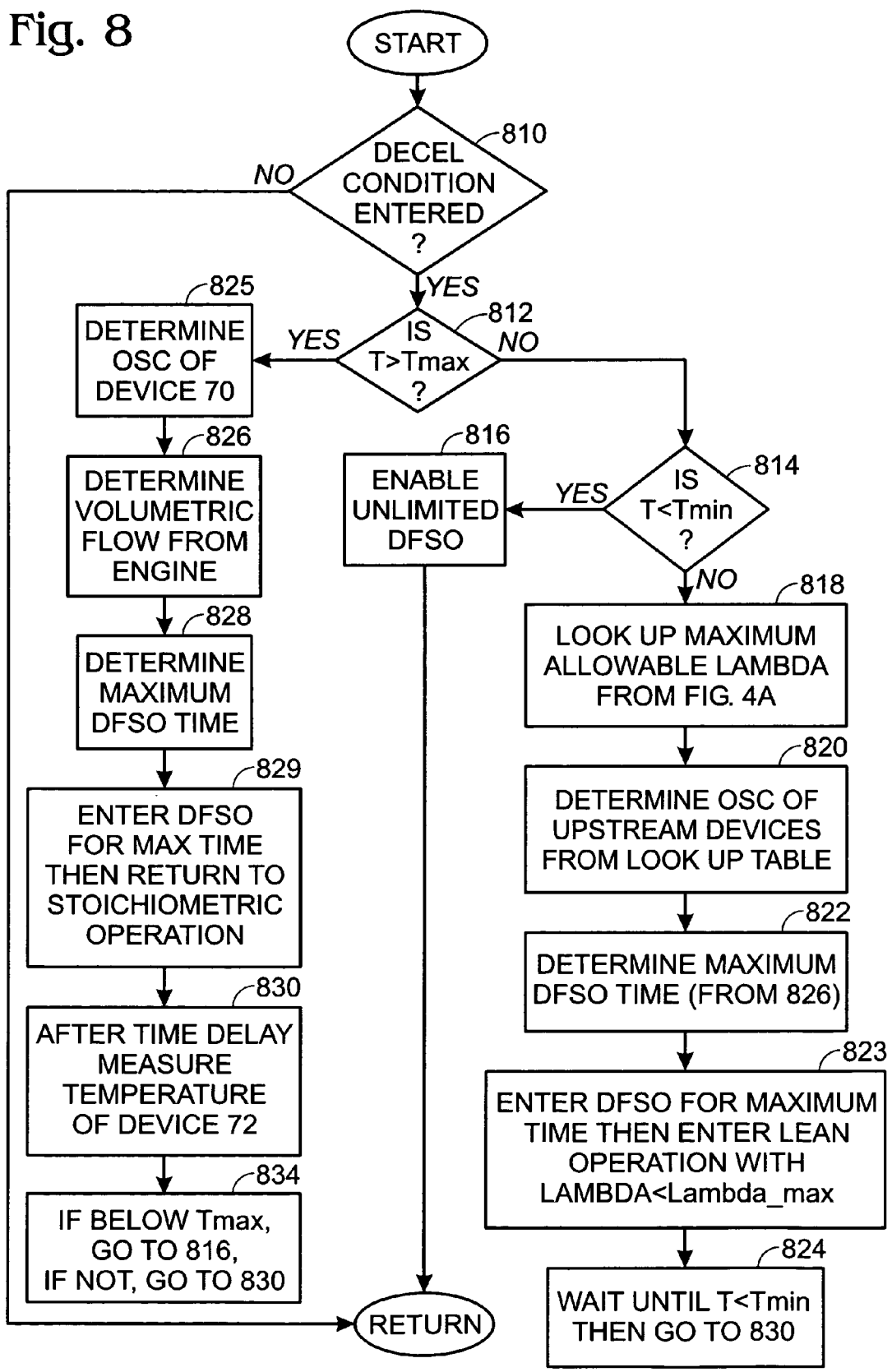

Referring now to FIG. 8, still another embodiment is described for enabling deceleration fuel shutoff. First, in step 810, the routine determines whether deceleration condition has been entered in a manner similar to that described above with regard step 510.

When the answer to step 810 is NO, the routine continues to the return block. Alternatively, when the answer to step 810 is YES, the routine continues to step 812. In step 812, the routine determines whether the measured (or estimated) temperature of the downstream emission control device 72 is greater than the maximum allowed temperature (Tmax). When the answer to step 812 is NO, the routine continues to step 814. In step 814, the routine determines whether the measured or estimated temperature is less than the threshold (Tmin). When the answer to step 814 is YES, the routine continues to step 816 to enable deceleration fuel shutoff.

Alternatively, when the answer to step 814 is NO, the routine continues to step 818 to determine the maximum allowable air-fuel ratio from the look up table embodying the information in FIG. 4A. Next, the routine continues to step 820, where the routine determines the oxygen storage capacity of the upstream device based on operating conditions, such as, for example: temperature, the current state of oxygen storage, the maximum oxygen storage capacity, exhaust air-fuel ratio, and combinations thereof. Then, in step 822, the routine determine the maximum fuel shut-off time (see steps 825 and 826), which in one example, represents the amount of time the upstream device can continue to store oxygen before reaching its capacity, thereby maintaining the downstream exhaust air-fuel ratio near stoichiometry. Then, in step 823, the routine operates the engine to enter DFSO for the maximum time calculated, and once this time occurs, to enter lean operation with the lean air-fuel ratio set less than the maximum allowed air-fuel ratio determined from operating conditions as shown in FIG. 4A. Note that during this operation, in step 824, the routine continues to monitor the temperature of device 72. If the temperature of device 72 falls below the maximum allowable temperature, the routine transitions to step 830. If not, the routine returns to step 814.

Note also that he maximum allowable air-fuel ratio determined in step 818 can represent an average exhaust gas mixture air-fuel ratio value, as previously described above.

According to operation as in FIG. 8, it is both possible to enable lean deceleration conditions to thereby save fuel, while at the same time reducing any potential coarsening of the catalyst particle size in the emission control system.

Continuing with FIG. 8, when the answer to step 812 is YES, the routine continues to step 825 to determine the oxygen storage capacity of the upstream device. As indicated above, this can be based on various factors, such as catalyst temperature from a temperature sensor, or estimated based on operating conditions. Further additional parameters can also be considered, if desired, such as catalyst space velocity, exhaust air-fuel ratio, the current state of the catalyst oxygen storage, catalyst degradation factors, and various others and combinations thereof.

Next, in step 826, the routine determine the volumetric flow from the engine (from engine RPM and manifold pressure (MAP), and/or throttle position, or combinations thereof, for example). This volumetric flow can be used, along with the oxygen storage capacity, to determine how much longer the device can continue to store incoming oxygen (step 828).

From step 828, the routine continues to step 829, where the routine enters DFSO for the maximum time calculated, and then returns to stoichiometric operation.

Note that during this operation, in steps 830 and 834, the routine continues to monitor the temperature of downstream device. If the temperature of the downstream device falls below the maximum allowable temperature, the routine transitions to step 816. If not, the routine returns to step 830.

Figure 9:
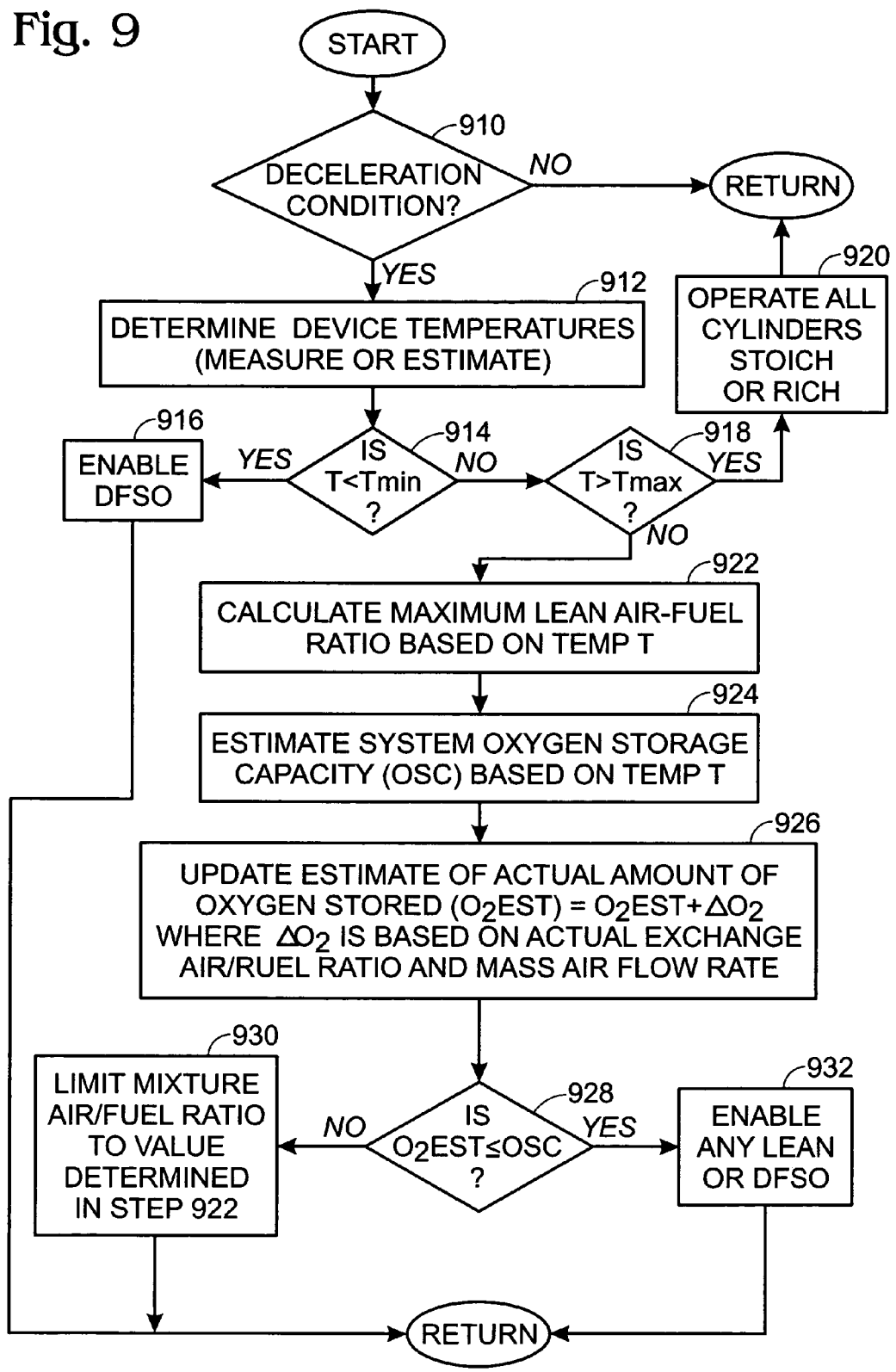

Referring now to FIG. 9, yet another alternate embodiment is described for determining whether to enable deceleration fuel shutoff condition based on exhaust conditions. First, in step 910, the routine determines whether a deceleration condition has been entered as described above herein with regard to step 510.

When the answer to step 910 is YES, the routine continues to step 912 and determines temperature of devices 70 and 72. These temperatures can be measured from temperature sensors, or estimated based on engine operating conditions such as engine speed and load. From step 912, the routine continues to step 914. In step 914, the routine determines whether temperature of device 72 is less than the minimal temperature (Tmin). When the answer to step 914 is YES, the routine continues to step 916 to enable deceleration fuel shutoff.

When the answer to step 914 is NO, the routine continues to step 918 to determine whether temperature of device 72 is greater than the maximum allowed temperature (Tmax). When the answer to step 918 is YES, the routine continues to step 920 to operate all the cylinders at or near the stoichiometric value, or rich of stoichiometry.

Continuing with FIG. 9, when the answer to step 918 is NO, the routine continues to step 922. In step 922, the routine calculates a maximum lean air-fuel ratio based on the temperature of device 72 as described above herein with regard to FIG. 4A. Next, in step 924, the routine estimates the system oxygen storage capacity (OSC) based on the temperatures of the devices 70 and 72. Next, in step 926, the routine updates the estimate of actual amount of oxygen storage (O2est) based on the current estimate and the change in oxygen storage. The change in oxygen storage ($\Delta$O2) based on the actual exhaust air-fuel ratio and mass air flow rate. In addition, other parameters can be used, such as the catalyst space velocity. Next, in step 928, the routine determines whether the estimate of oxygen storage is less than the storage capacity (OSC). When the answer to step 928 is NO, the routine continues to step 930 to limit the mixture air-fuel ratio to value determined in step 922. Otherwise, when the answer to step 928 is YES, the routine continues to step 932 to enable any lean or any lean air-fuel ratio or enable any deceleration fuel shutoff.

As described above, various approaches to enabling DFSO are described in which the engine operation in the AVOID region of FIG. 4A is reduced. As described, in one approach, the lean air-fuel ratio of the engine is limited to a value that varies as a function of temperature. In another approach, the limiting of the air-fuel ratio is suspending during the period where an upstream catalyst still has available oxygen storage capacity. In still another approach, the air-fuel ratio is returned to stoichiometry or rich if conditions occur that would cause the exhaust system to operate in the AVOID region of FIG. 4A. In yet another approach, the air-fuel ratio is limited to the maximum allowed lean air-fuel ratio (which can be a function of temperature) if conditions occur that would cause the exhaust system to operate in the AVOID region of FIG. 4A.

Within the control logic for each example implementation discussed herein, it can be modified to take measures if degradation of a sensor is identified. This default operation can include a variety of response. In one example, if there is degradation of a temperature sensor identified (such as the temperature sensor used to measure exhaust temperature, or device temperature) the routine would reduce, or eliminate, exposure to excess oxygen, so the DFSO would be disabled. Further, an indicator light could be illuminated to inform the vehicle operator. Alternatively, a HEGO or UEGO sensor could be used to adaptively determine the OSC (oxygen storage capacity) of the first brick of an emission control device. If so, degradation of this sensor could be monitored, and if identified, DFSO could also be disabled.

Figure 10:
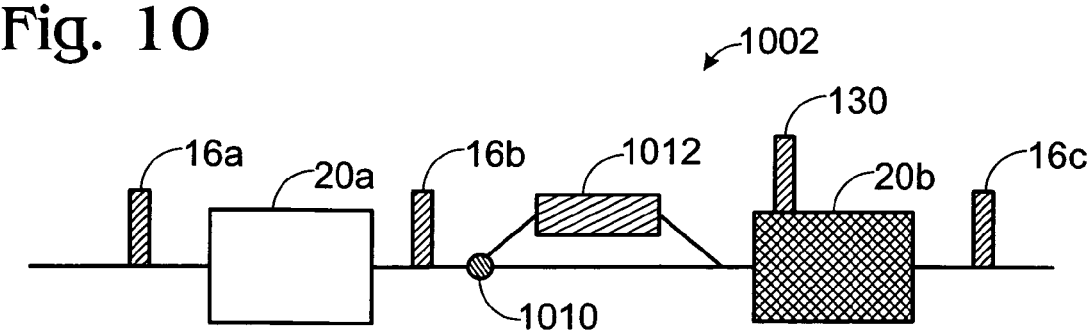
FIG. 10 is a block diagram of an example exhaust system with a cooling loop.

In addition, in yet another alternative embodiment, the system of FIGS. 1A and 1B can include a cooling loop in the exhaust as illustrated in FIG. 10. Specifically, in one example, the system uses a by-pass valve 1010 (which can be 2-way valve, or proportional valve) to pass exhaust gas (in whole or in part) to the loop 1002. In one example, the cooling loop is a longer exhaust pipe, thereby increasing cooling by providing higher surface area and residence time. In another example, as illustrated in FIG. 10, a heat exchanger 1012 is used. Heat exchanger 1012 can be an exhaust to air type (as illustrated, where heat is transferred form the exhaust gas to the surrounding air), or an exhaust to water/coolant type having a radiator over which exhaust gas flows. The exhaust system of FIG. 10 shows two emission control device 20a and 20b, arranged in series. Further, three exhaust gas oxygen sensors are used, 16a (upstream of device 20a), 16b (between devices 20a and 20b), and 16c (downstream of device 20b). Further, a temperature sensor 130 is shown for measuring temperature in device 20b. This system is similar to FIG. 4B, except that the heat exchanger is shown between devices 20a and 20b. Note that the heat exchanger could be located upstream of device 20a, if desired. Also, additional catalysts and sensors can also be used. Further, only a single downstream catalyst can be used, without upstream catalyst 20a. Also, as in FIG. 4B, multiple catalyst bricks can be located in devices 20a or 20b.

In this case, in one example, the cooling loop is used to reduce exhaust gas temperature if the exhaust operates in the region labeled AVOID in FIG. 4A. Further, the cooling loop is specifically used during DFSO operation to extend DFSO operation. In addition, in another example, the cooling loops is used along with oxygen storage of an upstream catalyst to extend DFSO operation.

Figure 11:
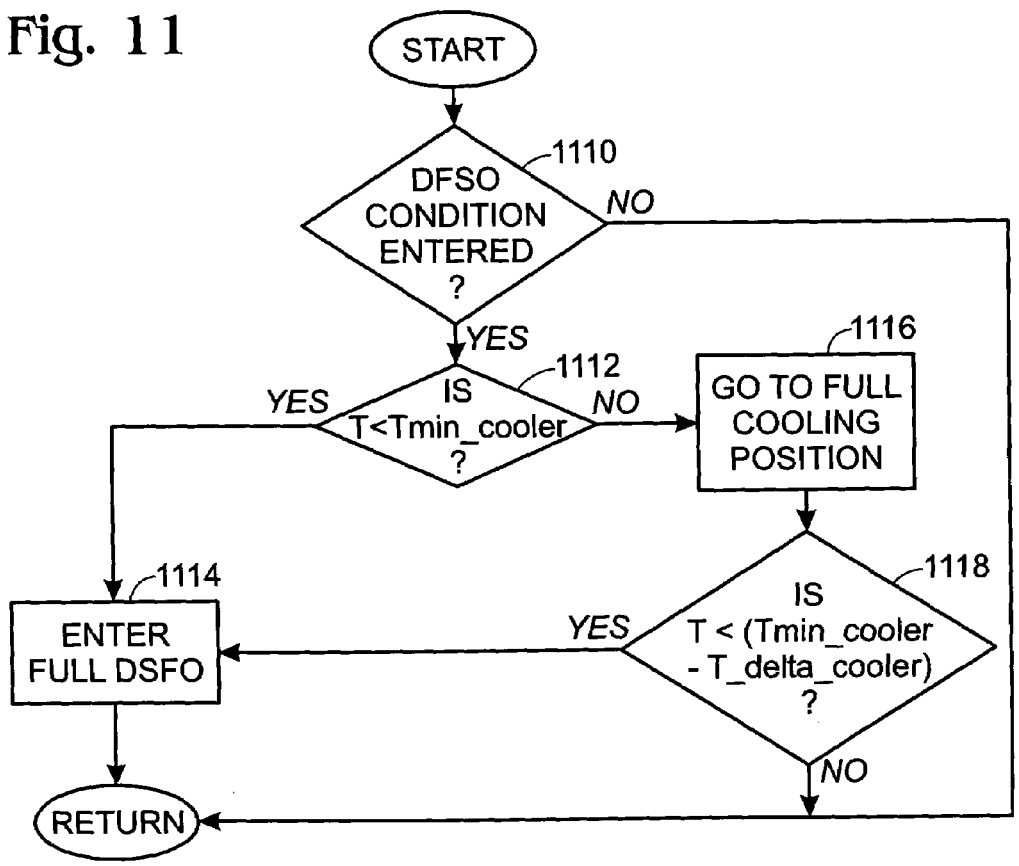

In one example, during DFSO conditions, the cooling loop is utilized to reduce exhaust gas temperature if the exhaust gas temperature becomes greater than a minimum cooler temperature (Tmin_cooler). Further, a delta (T_delta_cooler) is used to avoid excessive cycling of the cooling loop valve. Specifically, as shown in FIG. 11 below, first, in step 1110, the routine determines whether a deceleration condition has been entered as described above herein with regard to step 510. Then, in step 1112, the routine determines whether the exhaust temperature T is less than the threshold Tmin_cooler. If so, the routine enables full DFSO of all cylinders in step 1114. If no, in step 1116, the routine enable full cooling via the cooling loop 1002. Then, in step 1118, the routine determines whether exhaust temperature T is less than the threshold Tmin_cooler minus the delta (T_delta_cooler). If no, the routine repeats and maintains exhaust gas cooling. Alternatively, if the answer to step 1118 is YES, the routine continues to step 1114 to enable full DFSO operation.

In this way, it is possible to provide a greater range of operating conditions over which DFSO can be enabled, without operating in conditions which can increase catalyst particle growth.

Figure 12:
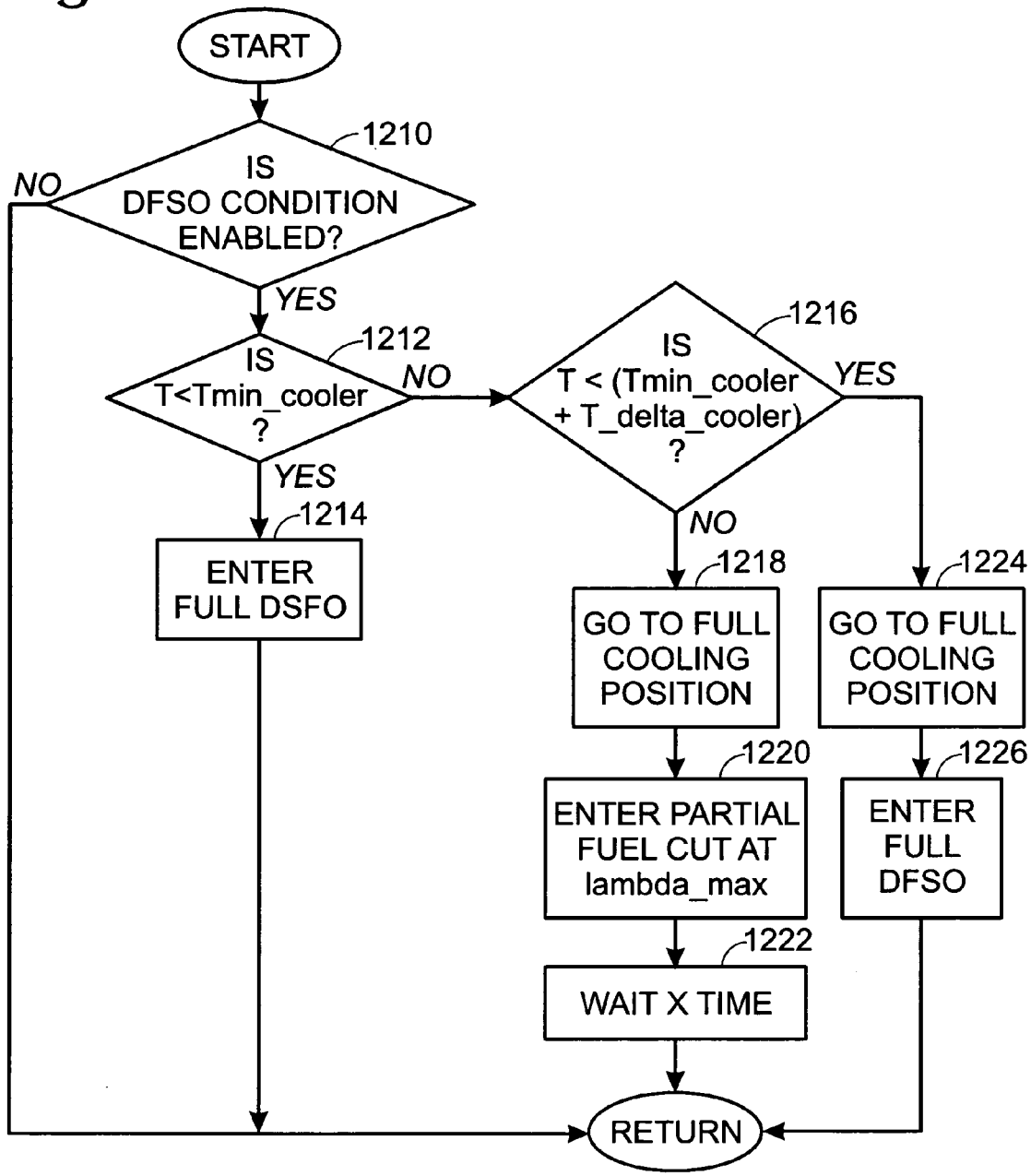

Referring now to FIG. 12, an alternative embodiment using a cooling loop is described. Specifically, as shown in FIG. 12 below, first, in step 1210, the routine determines whether a deceleration condition has been entered as described above herein with regard to step 510. Then, in step 1212, the routine determines whether the exhaust temperature T is less than the threshold Tmin_cooler. If so, the routine enables full DFSO of all cylinders in step 1214. If no, in step 1216, the routine determines whether exhaust temperature T is less than the threshold Tmin_cooler plus the delta (T_delta_cooler). If no, the routine continues to step 1218 to enable full cooling via the cooling loop. Then, in step 1220, the routine enables partial fuel cut at the maximum allowed lambda value for the current exhaust temperature as shown by the data in FIG. 4A (for example). Partial fuel cut operation can include operating some cylinders without fuel injection, and others at a lean or stoichiometric condition, so that an overall exhaust air-fuel ratio entering the catalyst is less than the maximum allowed lean air-fuel ratio as determined as indicated in FIG. 4A. Alternatively, partial fuel cut operation can include operating all cylinders at the maximum allowed lean air-fuel ratio, if this is not past the lean combustion limit for the current engine combustion mode. Then, the routine waits x seconds in step 1222. The amount of time waited is calibrated based on experimental testing.

Continuing with FIG. 12, if the answer in step 1216 is no, the routine continues to step 1224. In step 1224, the routine enables full cooling via the cooling loop 1002. Then, in step 1226, full DFSO of all cylinders is enabled.

In this way, it is possible to provide a greater range of operating conditions over which DFSO can be enabled, without operating in conditions which can increase catalyst particle growth.

Note that still other embodiments can be used which further incorporate taking into account the oxygen storage of an upstream catalyst, if equipped. In other words, a full DFSO proportional to OSC of the upstream catalyst, followed by a return to lambda=1 until T falls below Tmin can be used. Alternatively, the system can return to the maximum allowed lean air-fuel ratio.

As indicated above, degradation of input values used in enabling DFSO can occur, and default operation selected in such a case. Some example inputs into the enablement of DFSO strategy are device temperature(s) (sensor or model) and A/F ratio. When either of these inputs degrade, the DFSO strategy is adjusted to take actions accordingly, in each of the example implementations discussed above. In general, if degradation of a temperature sensor is identified, exposure to excess oxygen (e.g., lean) can be reduce, or eliminated, along with illuminating an indicator lamp. Specifically, the following example actions (or combinations thereof) can be taken:

1. When a temperature sensor degrades, disable DFSO operation. Alternatively, a modeled temperature can be substituted to continue to enable DFSO, and other lean, operation.
2. When an air/fuel sensor (that is being used for DFSO) degrades, other air/fuel sensors could be used to estimate the degraded air-fuel ratio to continue to enable (and be used during) DFSO. In one method, when the device temperature is above Tmin and below Tmax, the DFSO is performed by operating the engine in a controlled lean mode, so as to keep the exhaust air/fuel ratio below the corresponding lambda_max. The UEGO sensor can be used to maintain or monitor this air/fuel ratio. However, if the UEGO sensor degrades, the feedgas HEGO (in the exhaust manifold) and a HEGO sensor located in a downstream catalyst (or downstream of a downstream catalyst) can be used to produce a substitute estimate for enabling and controlling DFSO. In this case, the DFSO is enabled when the device temperature is Tmin where exhaust air/fuel ratio control accuracy is low enough to reduce any potential degradation to the device. This mechanism can be used even if none of the HEGO sensors are operable. (Note that the strategy for reestablishing the catalyst is based on a model without using any HEGO sensors.)

3. If the device state or aging information is erroneous (discussed below), DFSO can be performed below the Tmin wherein the lean a/f due to DFSO does not impact the aging of the device. However, if it is determined that the device is completely aged and lean-burn is disabled, one can perform DFSO treating the downstream device as a catalyst optimized for stoichiometric operation, or perform DFSO below Tmin temperature only. This would enable fuel savings even when lean burn operation degrades. Further, a controlled rich duration to regenerate the OSC after DFSO could then be used in this case.

Figure 13:
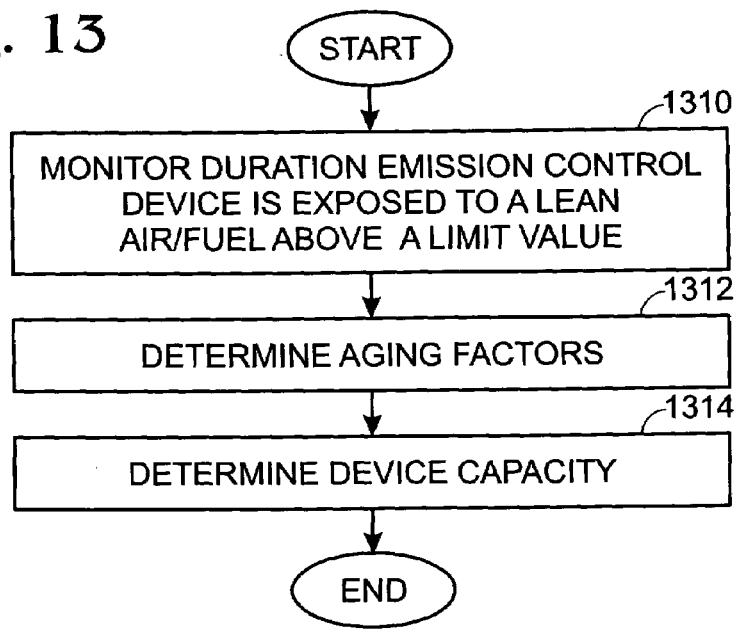

Referring now to FIG. 13, a method for determining aging of the emission control device due to Pt coalescing and using sulfation state estimation is now described. Specifically, as described above, when an emission control device, such as those that retain NOx and oxygen when lean, and release and reduce the stored oxidants when operating stoichiometric, or rich, is exposed to high temperature, the Pt in the device can coalesce to form bigger particles thereby reducing the efficiency and capacity of NOx absorption or adsorption. The rate of this coalescing phenomenon is a strong function of the oxygen partial pressure in the exhaust, which varies with engine air/fuel ratio. Additionally, during lean operation, the sulfur in the fuel is can be retained by the device thereby reducing the efficiency and/or capacity of the trap. This is caused, in one example, by the chemical reaction of NOx storing element BaO with sulfur to form BaSO4. Of these two mechanisms, sulfation can be reduced by performing desulfation (described below herein where the device temperature is raised above a predetermined value, and the air-fuel ratio is cycled between lean and rich while the temperature is above the predetermined value).

Thus, the device capacity/efficiency changes due to various factors, two of which discussed here are: sulfur contamination and Pt particle growth. (Note that additional effects can be included, if desired). To determine the amount degradation in the device capacity due to sulfur in the LNT, so as to use the information for initiating a deSOx event, the loss of capacity/efficiency in the device due to Pt coalescing is separated as shown below.

As illustrated in FIGS. 2 and 3, a mechanism was provided to determine in a quantitative manner the degree of Pt crystal growth due to coalescing of Pt as a function of temperature and oxygen partial pressure. The loss in the device efficiency/capacity is related to the growth of the Pt crystal size. Therefore, by determining the temperature and a/f (or oxygen partial pressure) conditions the device is exposed to during a historical period, for example, the degree of permanent loss of capacity can be determined as illustrated in the following equations, and as indicated in FIG. 13. Specifically, the method, and corresponding computer code, utilizes an example relationship between temperature, A/F Ratio, Time of exposure and Loss of Capacity/Efficiency as:

$$Aging\_Factor = f(AFR, Exp\_Temperture, Exp\_Time)$$

One specific example of the relationship could be the following:

$$Aging\_Factor = S(K1*AFR + K2*Exp\_Temperature)*Exp\_Time$$

Where,

K1=aging sensitivity due to AFR determined from experiments at a baseline temperature (eg: 500 deg. C.).

K2=aging sensitivity due to temperature the LNT is exposed. The exposed temperature could be the actual temperature or temperature above a baseline temperature. For example, if the LNT is exposed to 700 deg. C., the Exp_temperature can be assumed as 700 or as (700–500, in one example) and K2 will vary accordingly.

Exp_Time=Exposure time of LNT at Exp_temperature and AFR air/fuel ratio.

K1 and K2 can be determined from the data shown in the plots that show the change in the Pt crystal size under various operating conditions. Also, this is just one example implementation, and various other forms of manipulation, or equations, or tables, can be used.

Note also that the variable (Aging_Factor) is just one example of a factor that can be used to determine the effect on device performance due to particle growth. Various other types of operations can provide a factor that is used to determine device performance. For example, look up tables can be used to determine device performance based on various forms of information.

In the above procedure, Exp_Time is obtained by storing the integrating the time an emission control device is exposed to at given a/f ratio and temperature and storing in a KAM table which retains the memory even after the controller power is turned off. At every operation, the time of operation is distributed and added to the table so that the table will reflect the total time the device is operated at a given temperature (or temperature window) during its life on the vehicle. Alternatively, this time can be reset if a new device is placed on the vehicle. Further, such a duration can be retained for each device in the exhaust system, and also can be retained for each brick in an emission control device, by estimating or measuring the exhaust air-fuel ratio and temperature on a brick-by-brick basis.

Referring now specifically to FIG. 13, in step 1310 the routine determines a duration an emission control device is exposed to at given a/f ratio above a limit value (determined as illustrated in FIG. 4A, for example). Then, in step 1312, the aging factors describe above are calculated. Next, in step 1314, at any given time during the life of the vehicle where it is desired to determine device performance, the capacity loss due to sulfation of the device can be determined as follows:

$$DEVICE\_CAP\_LOSS\_SULF = DEVICE\_CAP\_FRESH*Aging\_Factor - DEVICE\_CAP_{SULF-AGED}$$

Where,

DEVICE_CAP_LOSS_SULF=capacity loss due to sulfation.

DEVICE_CAP_FRESH=Capacity of a fresh device at zero aging and zero sulfation

Aging_Factor=Aging of the device due to Pt crystal growth

DEVICE_CAP_SULF_AGED=device capacity after sulfation and aging. It is determined on-board the vehicle through purge fuel estimation (e.g., the amount of fuel used during rich operation to reduce NOx that was stored in the device during a previous lean operation), oxygen capacity changes, and other operating conditions, for example.

Based on this improved estimate of NOx storage capacity, it is possible to more accurately control engine air-fuel ratio, and lean operation duration, to improve overall efficiency and performance. For example, if lean engine operation is terminated based on an amount of NOx retained relative to capacity (e.g., by adjusting fuel injection base on said capacity), this improved capacity estimate can therefore result in improved lean duration control.

Note also that in addition to determining effects of capacity, effects due to particle growth on conversion efficiency can also be determined and included in engine control routines.

This improved estimate that separates the effect of sulfation from the aging due to PGM crystallization of the device can be used in various ways. For example, with such an approach, a more accurate estimate of the level of device sulfation can be determined. This more accurate estimate of the level of sulfur can be used for the following tasks.

1. Determining when Trigger and End the deSOx

When the sulfation level of sulfation reaches a threshold level, a deSOx cab be initiated to restore the temporary loss of capacity due to sulfur. The desulfurization process includes increase temperature above a threshold, and providing a rich air-fuel ratio (or an air-fuel ratio that oscillates about stoichiometry, as shown below). Also, the estimate level of sulfation can be used to determine the amount of time (or alternatively a duration measured in miles, or engine revolutions, or by some other measure) the deSox process needs to be performed. During, or after, performing a deSOx, the device state can be determined to evaluate whether the device was successfully deSOxed. This can be done in various ways, such as by comparing the device capacity after a deSox to the estimated value of device capacity without sulfur (yes adjusted for aging due to PGM crystallization).

2. As Information Input Into the Device NOx Absorption/purge Model

The aging information of the device can also be used to adjust the maximum NOx storage capacity of the device without any sulfation. The model is separately adjusted for the level of sulfur in the trap. By adjusting this way, the accuracy of the model is increased. This can allow better emissions control by triggering NOx purges (rich operation to reduce NOx stored during a previous lean operation) at the correct instant to maintain overall NOx efficiency of the system at a target level.

3. NOx Purge a/f Selection

Based on the aging and sulfation state of the device, the air/fuel ratio for NOx purge can be adjusted to minimize the amount of NOx released during a purge.

4. Disable Lean Operation

With the improved aging information of the device, if it is determined that the device has degraded in its NOX storage capacity due to PGM crystallization, lean operation may be disabled. This is because the PGM aging effect is not as easily, reversed (if at all) as opposed to sulfation, which can be reduced by a deSOx process.

5. On-board Diagnostics

The device state can also be used for diagnostic purposes. When the device capacity, after a deSox, falls below a minimum threshold, lean-burn combustion is disabled, due to the reduced benefit of operating lean. At this time, the device is used an underbody catalyst operated about stoichiometry. The PGM aging information in this case can be used as a monitoring mechanism to determine whether to illuminate an indicator lamp.

Figure 14:
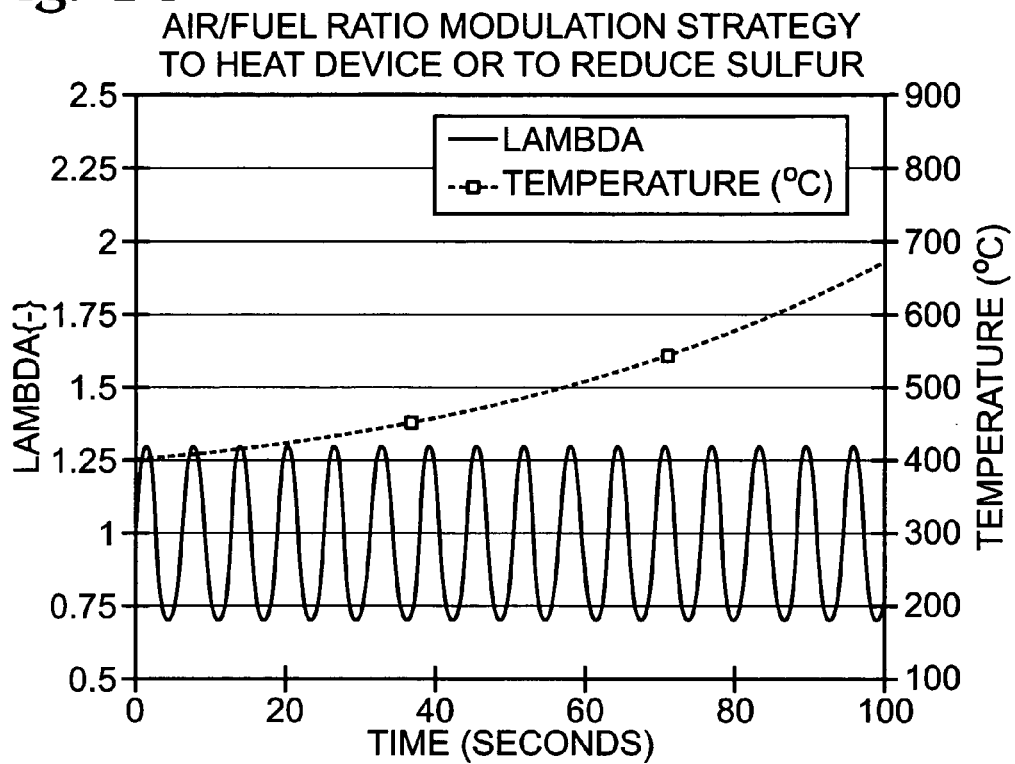
FIGS. 14 and 16 show graphs of system operation.
Figure 16:
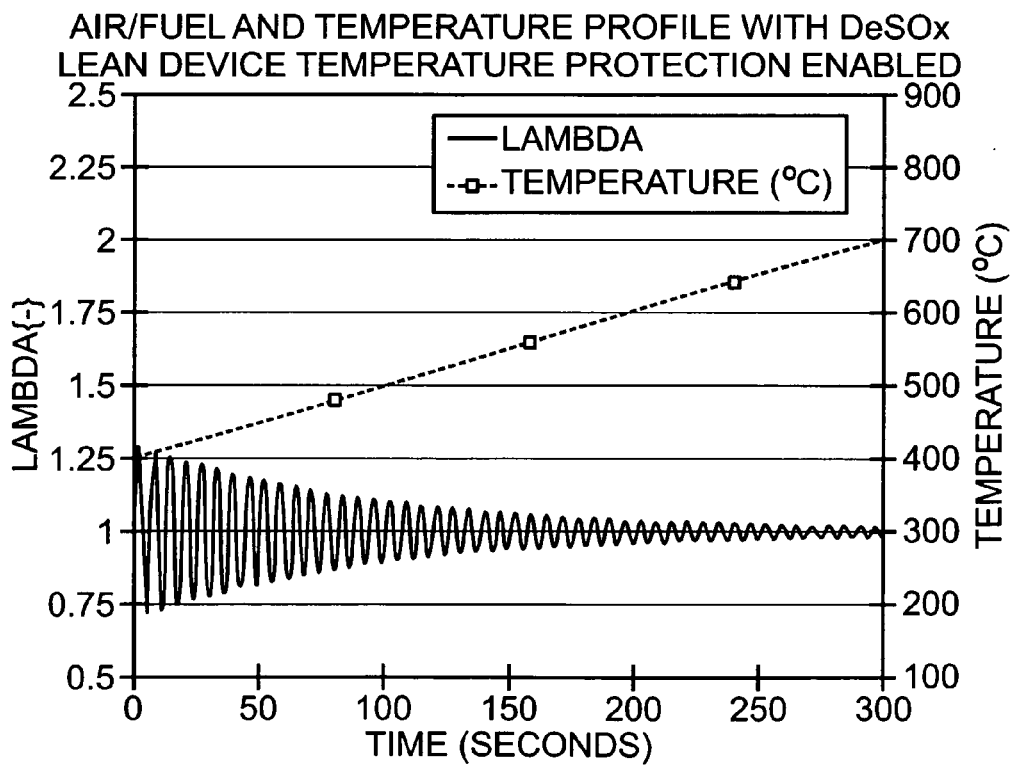
Figure 15:
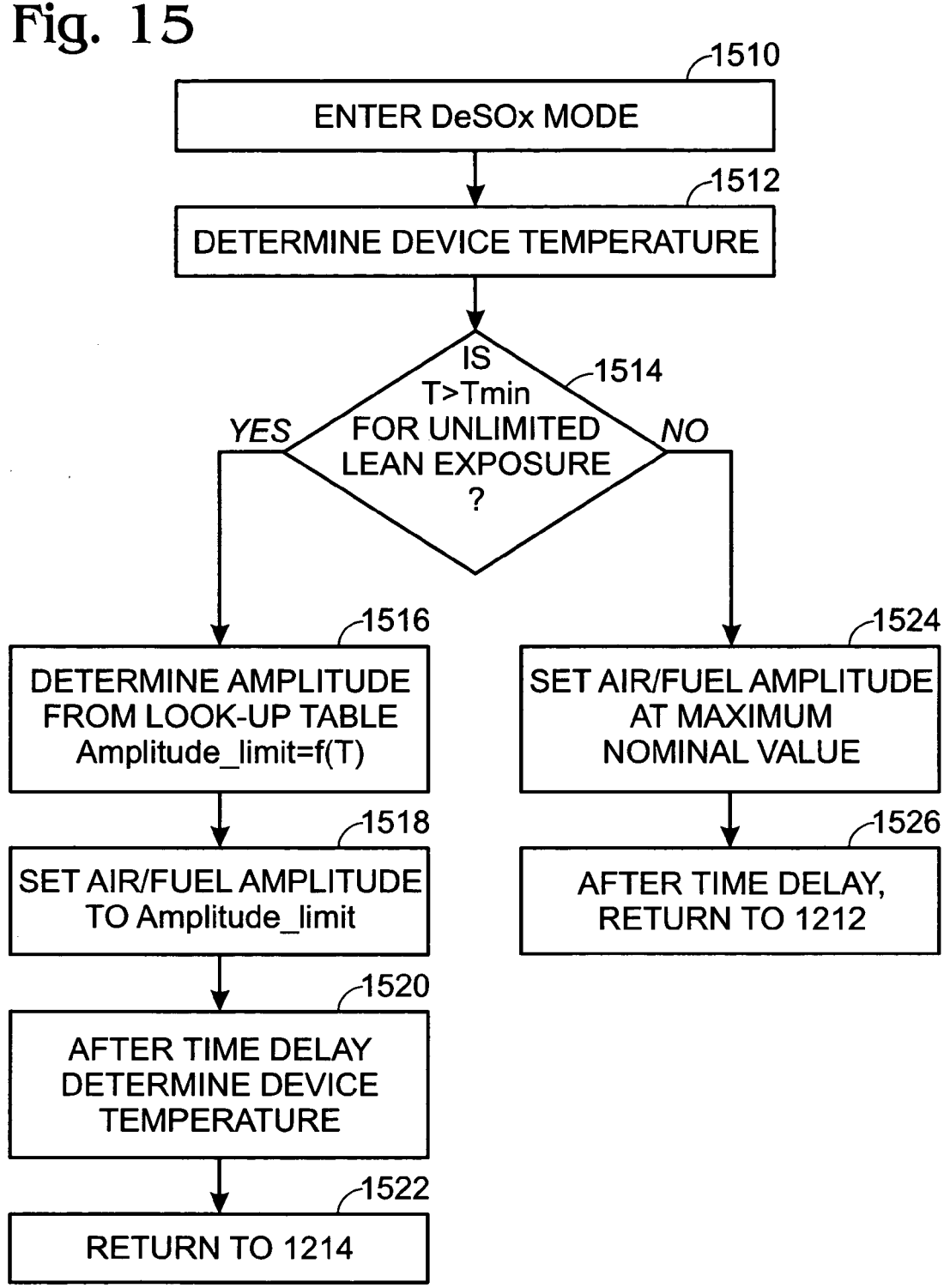

Referring now to FIGS. 14–16, a system is described for performing a desulfation process(deSOx).

Specifically, high temperature fuel rich conditions are used to remove sulfur contaminating the emission control devices. One approach to heat the exhaust to required temperatures is to modulate the engine air fuel ratio from lean to rich as shown in FIG. 14. As the air fuel ratio is modulated, an exotherm is generated on the oxygen storage materials that are present both in the upstream and downstream device to accumulate heat in the catalysts. This results in the temperature rise shown in FIG. 14. Once sufficient temperature is reached to achieve desulfation (typically above 650° C.), the air fuel ratio can then be modulated more slowly to prevent slip of H2S in the exhaust. Comparing FIGS. 4A and 14 shows that the temperatures for desulfation could fall above the Tmin for unlimited lean exposure. If this is the case, then modulating the air fuel ratio without restriction above this temperature could result in thermal degradation of the device due to, for example, particle growth.

While this may be acceptable in some circumstances, an alternative approach is described below. Specifically, a strategy is used to reduce thermal damage to the catalyst during desulfation by using the thermal degradation map shown in FIG. 4A. In this approach, the amplitude of air/fuel modulation is limited as a function of temperature so that exposure of the device to a temperature and lean air-fuel ratio corresponding to the region label AVOID in FIG. 4A is reduced.

Referring specifically to an example routine in FIG. 15, in step 1510, the routine enters the desulfurization mode. Then, in step 1512, the routine determines the temperature of the downstream device such as, for example: device 412. Note that there are various methods to determine device temperature, such as determining an estimate of temperature based on engine operating conditions, or measuring device temperature from a temperature sensor, such as sensor 426. Next, in step 1514, the routine. determines whether the determined temperature (T) is greater than the minimum temperature for a limited lean exposure (Tmin). When the answer to step 1514 is YES, the routine continues to step 1516 to determine amplitude from a lookup table as a function of the device at temperature T. In one example, the amplitude limit as a function of temperature decreases as temperature increases. Next, in step 1518, the routine sets the air-fuel amplitude setpoint to the amplitude limit as determined in step 1516. In particular, the fuel injection is adjusted to modulate the air-fuel ratio between limit values set by the amplitude limit. In addition, if desired, adjustment of the amplitude and frequency can be accomplished based on exhaust gas oxygen sensors. Next, in step 1520, after a time delay the device temperature is again determined as in step 1512. Then, in step 1522, the routine returns to step 1514.

Continuing with FIG. 15, if the answer to step 1514 is NO, the routine continues to step 1524 where the air-fuel ratio amplitude is set at the maximum nominal value. Then, in step 1526, after a time delay, the routine returns to step 1512.

Note that the decision to enter the desulfurization mode (step 1510) is based on various operating conditions, such as determinations of device performance, efficiency, and/or capacity. In addition, vehicle or engine operating conditions can also be considered in order to select conditions that provide improved desulfurization performance. Furthermore, before performing desulfurization oscillation of the engine air-fuel ratio, the exhaust gas temperature is first raised to a predetermined level. As discussed above, there are various approaches to raise exhaust gas temperature such as, for example: oscillating engine air-fuel ratio to take advantage of oxygen storage capacity in the emission control system, returning ignition timing, or operating with a split air-fuel ratio in different cylinder groups thereby creating an exothermic reaction when the exhaust gases meet.

Example operation of the strategy shown in FIG. 15 is shown in FIG. 16, which shows the resulting air/fuel and temperature profiles. As shown in FIG. 16, the amplitude of air/fuel modulation decreases as the device temperature increases. The amplitude allowed is a function of temperature and corresponds to the curved line delineating the AVOID region in FIG. 4A, in this particular example. Note that this strategy can require longer times to heat the catalyst as the heat input rate will decrease as the amplitude of modulation decreases, however this can lead to improved desulfation and catalyst performance.

Note that the strategy described above can be modified, if desired, in numerous ways. For example:

1. The period of modulation could be increased as the amplitude decreases to maintain a constant amount of reductant delivered during the rich transition and oxygen during the lean transition.
2. This strategy could also be used to limit the amplitude at high temperature to prevent H2S formation. Again, the period could be increased to make up for the smaller amplitude.
3. The strategy could be modified to have a two-step modulation with the first step at max lean for a period of time corresponding to the OSC (oxygen storage capacity) of the first brick and the second step to correspond to the amplitude_limit determined in the strategy.
4. The modulation could be asymmetric such that the lean amplitude and rich amplitude are unequal but the period of modulation of each would be adjusted so the integral of each signal is equal. This would result in a longer lean period with lower amplitude and a shorter rich period with larger amplitude.
5. Point 3 and 4 could be combined to have a two-step lean period and a rich period with equal integrated lean and rich exposure.
6. The period of the modulation could also be adjusted as a function of the temperature of the first brick such that no oxygen breakthrough from the first brick could occur due to the OSC of this brick. An oxygen sensor downstream of this brick could be used such that an adaptive strategy to determine OSC of the first brick could be used to further refine the OSC estimation for additional device protection.
7. This strategy can be used with Diesel systems, such as wherein the first catalyst does not contain OSC. In this case, the two-step lean period could be eliminated.
8. This strategy can be used with Diesel systems wherein the system does not contain any first catalyst. In this case, the two-step lean period could be eliminated.

This concludes the description of example embodiments. The reading of it by those skilled in the art would bring to mind many alterations and modifications without departing from the spirit and the scope of the invention. For example, the method and systems described above can be used with both diesel and gasoline engines, direct and indirect injection engines, and passenger car vehicles or heavy truck vehicles.

We claim:

1. A method for evaluating performance of an emission control device coupled in an exhaust system of a vehicle driven on the road, the method comprising:
   determining a first factor based on a duration during which the emission control device is exposed to a lean air-fuel ratio above a limit value, said limit value determined as a function of temperature in the exhaust system;
   determining a second factor based on an amount of sulfur contamination of said emission control device; and
   determining a performance value for said emission control device based on said first and second factors.

2. The method recited in claim 1 wherein said second factor is based on an estimated amount of sulfur retained in said emission control device.

3. The method recited in claim 1 wherein said second factor is based oh duration of vehicle operation.

4. The method recited in claim 1 wherein said temperature is temperature of the emission control device.

5. The method recited in claim 1 wherein said first factor is further based on a duration of time the emission control device is exposed to said lean air-fuel ratio above said limit value.

6. The method recited in claim 1 wherein said first factor is further based on a duration of engine revolutions the emission control device is exposed to said lean air-fuel ratio above said limit value.

7. The method recited in claim 1 wherein said first factor is further based on a duration of vehicle miles driven during which the emission control device is exposed to said lean air-fuel ratio above said limit value.

8. The method recited in claim 1 wherein said performance value is a storage capacity.

9. The method recited in claim 1 wherein said first factor determines degradation due to platinum growth in said emission control device.

10. A method for evaluating performance of an emission control device coupled in an exhaust system of a vehicle driven on the road, the method comprising:
    determining a first factor based on a duration during which the emission control device is exposed to an exhaust gas mixture with an oxygen partial pressure above a limit value, said limit value determined as a function of temperature in the exhaust system;
    determining a second factor based on an amount of sulfur contamination of said emission control device; and
    determining a performance value for said emission control device based on said first and second factors.

11. The method recited in claim 10 wherein said second factor is based on an estimated amount of sulfur retained in said emission control device.

12. The method recited in claim 10 wherein said second factor is based on duration of vehicle operation.

13. The method recited in claim 10 wherein said temperature is temperature of the emission control device.

14. The method recited in claim 10 wherein said first factor is further based on a duration of time the emission control device is exposed to said lean air-fuel ratio above said limit value.

15. The method recited in claim 10 wherein said first factor is further based on a duration of engine revolutions the emission control device is exposed to said lean air-fuel ratio above said limit value.

16. The method recited in claim 10 wherein said first factor is further based on a duration of vehicle miles driven during which the emission control device is exposed to said lean air-fuel ratio above said limit value.

17. The method recited in claim 10 wherein said performance value is a storage capacity.

18. The method recited in claim 10 wherein said first factor determines degradation due to platinum growth in said emission control device.

19. The method recited in claim 10 further comprising adjusting a rich purge air-fuel ratio based on said performance value.

20. The method recited in claim 10 further comprising initiating and terminating a desulfurization process based on said performance value.

21. The method recited in claim 10 further comprising adjusting a NOx capacity threshold based on said performance value, where said NOx capacity threshold is used to terminate lean operation and transition to rich operation.

22. The method recited in claim 10 further comprising disabling lean operation based on said performance value.

23. The method recited in claim 10 further comprising indicating degradation of said device based on said performance value.

24. An article of manufacture have a computer readable storage medium with computer readable code for evaluating performance of an emission control device coupled in an exhaust system of a vehicle driven on the road, the medium comprising:

code for determining a first factor based on a duration of time during which the emission control device is exposed to a lean air-fuel ratio above a limit value, said limit value determined as a function of temperature of exhaust gasses in the emission control device;

code for determining a second factor based on an amount of sulfur contamination of said emission control device, said second factor based on an estimated amount of sulfur contamination determined from engine operating conditions; and code for determining a performance value for said emission control device based on said first and second factors, said performance value indicative of capacity of said emission control device to retain NOx during oxygen deficient exhaust gas conditions.

25. The article recited in claim 24 further comprising code for adjusting lean engine duration based on said performance value.

* * * * *